United States Patent
Miller et al.

(10) Patent No.: US 10,142,409 B2
(45) Date of Patent: *Nov. 27, 2018

(54) SYSTEM AND METHOD FOR IMPLEMENTING PNRP LOCALITY

(71) Applicant: Microsoft Technology Licensing, LLC, Redmond, WA (US)

(72) Inventors: John L. Miller, Cambridge (GB); Manuel Costa, Cambridge (GB); Noah Horton, Sammamish, WA (US); Christian Huitema, Clyde Hill, WA (US); Sandeep K. Singhal, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 267 days.

This patent is subject to a terminal disclaimer.

(21) Appl. No.: 13/632,664

(22) Filed: Oct. 1, 2012

(65) Prior Publication Data
US 2013/0031404 A1     Jan. 31, 2013

Related U.S. Application Data

(63) Continuation of application No. 12/883,346, filed on Sep. 16, 2010, now Pat. No. 8,310,956, which is a
(Continued)

(51) Int. Cl.
*H04L 29/08* (2006.01)
*H04L 12/26* (2006.01)

(52) U.S. Cl.
CPC ........ *H04L 67/104* (2013.01); *H04L 43/0858* (2013.01); *H04L 67/1068* (2013.01);
(Continued)

(58) Field of Classification Search
None
See application file for complete search history.

(56) References Cited

U.S. PATENT DOCUMENTS

| 4,731,799 A | 3/1988 | Longstaff et al. |
| 4,874,963 A | 10/1989 | Alspector et al. |

(Continued)

OTHER PUBLICATIONS

"Predicting Internet Network Distance with Coordinates-Based Approaches", by T.S. Eugene Ng and Hui Zhang, INFOCOM 2002, Twenty-First Annual Joint Conference of the IEEE Computer and Communication Societies, Proceedings, IEEE, vol. 1, pp. 170-179, 2002.

(Continued)

*Primary Examiner* — Yemane Mesfin
*Assistant Examiner* — Jeff Banthrongsack
(74) *Attorney, Agent, or Firm* — Ray Quinney & Nebeker, P.C.; Thomas M. Hardman; Ellen Wong

(57) ABSTRACT

A method is provided for a host node in a computer network to determine its coordinates in a d-dimensional network space, comprising discovering an address of a peer node in the network, measuring network latency between the host node and the peer node, determining whether network latency has been measured for at least d+1 peer nodes, where, if network latency has not been measured for at least d+1 peer nodes, estimating the network coordinates of the host node, and where, if network latency has been measured for at least d+1 peer nodes, calculating the network coordinates of the host node using d+1 measured latencies.

20 Claims, 4 Drawing Sheets

Related U.S. Application Data continuation of application No. 11/072,525, filed on Mar. 7, 2005, now Pat. No. 7,826,396.

(52) U.S. Cl.
 CPC ......... *H04L 43/0864* (2013.01); *H04L 43/12* (2013.01); *H04L 67/1046* (2013.01)

(56) References Cited

U.S. PATENT DOCUMENTS

| | | | |
|---|---|---|---|
| 5,293,457 A | 3/1994 | Arima et al. | |
| 5,307,289 A | 4/1994 | Harris | |
| 5,471,580 A | 11/1995 | Fujiwara et al. | |
| 6,725,281 B1 | 4/2004 | Zintel et al. | |
| 6,779,004 B1 | 8/2004 | Zintel et al. | |
| 6,892,230 B1 | 5/2005 | Gu et al. | |
| 6,912,622 B2 | 6/2005 | Miller | |
| 6,947,386 B2 | 9/2005 | de Castro | |
| 10,696,776 | 2/2008 | Huitema et al. | |
| 7,826,396 B2 | 11/2010 | Miller et al. | |
| 8,310,956 B2 | 11/2012 | Miller | |
| 2002/0027569 A1 | 3/2002 | Manni et al. | |
| 2002/0101860 A1 | 8/2002 | Thornton et al. | |
| 2002/0112058 A1 | 8/2002 | Weisman et al. | |
| 2002/0143989 A1* | 10/2002 | Huitema ........... | H04L 29/12066 709/243 |
| 2003/0055892 A1 | 3/2003 | Huitema et al. | |
| 2003/0056093 A1* | 3/2003 | Huitema ........... | H04L 29/12009 713/156 |
| 2003/0056094 A1 | 3/2003 | Huitema et al. | |
| 2003/0097425 A1 | 5/2003 | Chen et al. | |
| 2003/0117433 A1 | 6/2003 | Milton et al. | |
| 2003/0196060 A1 | 10/2003 | Miller | |
| 2003/0204742 A1* | 10/2003 | Gupta ............... | H04L 29/12009 726/22 |
| 2004/0062443 A1 | 4/2004 | Yen et al. | |
| 2004/0111469 A1 | 6/2004 | Manion et al. | |
| 2004/0148333 A1 | 7/2004 | Manion et al. | |
| 2004/0249907 A1 | 12/2004 | Brubacher et al. | |
| 2004/0255029 A1 | 12/2004 | Manion et al. | |
| 2004/0259571 A1 | 12/2004 | Yoshi et al. | |
| 2004/0260800 A1 | 12/2004 | Gu et al. | |
| 2005/0022210 A1 | 1/2005 | Zintel et al. | |
| 2005/0044195 A1* | 2/2005 | Westfall ................ | H04L 49/101 709/223 |
| 2005/0074018 A1 | 4/2005 | Zintel et al. | |
| 2005/0076137 A1* | 4/2005 | Tang ....................... | H04L 45/12 709/238 |
| 2005/0097503 A1 | 5/2005 | Zintel et al. | |
| 2005/0157659 A1 | 7/2005 | Huitema et al. | |
| 2006/0050651 A1* | 3/2006 | Brignone .............. | G01S 5/0289 370/254 |
| 2006/0209704 A1 | 9/2006 | Miller | |
| 2011/0004677 A1 | 1/2011 | Miller | |

OTHER PUBLICATIONS

Ng, T. S. Eugene and Hui Zhang, "A Network Positioning System for the Internet," USENIX Annual Technical Conference 2004, Boston, MA, 14 pages, Jun. 2004.

"Genetic algorithm," http://www.google.com/search?soureid-navelient &ie-UTF-8&ris-GGLG,GGLG:2005-3, 2 pgs. (Mar. 2006).

Ng, T. S. Eugene and Hui Zhang, "Towards Global Network Positioning," Extended Abstract, ACM SIGCOMM Internet Measurement Workshop 2001, San Francisco, CA, 5 pages, Nov. 2001.

Ng, T. S. Eugene and Hui Zhang, "Global Network Positioning: A New Approach to Network Distance Prediction," Student Poster, SIGCOMM '01, San Diego, CA, 1 page, Aug. 2001.

Costa, Manuel, Miguel Castro, Antony Rowstron, and Peter Key "PIC: Practical Internet Coordinates for Distance Estimation," ICDCS 2004, 10 pages, (Mar. 2004).

Dabek, Frank, Russ Cox, Frans Kaashoek, Robert Morris, "Vivaldi: A Decentralized Network Coordinate System," SIGCOMM 2004, 12 pages, Aug. 2004.

Cox, Russ, Frank Dabek, Frans Kaashoek, Jinyang Li, Robert Morris, "Practical, Distributed Network Coordinates," HotNets Workshop, 6 pages, 2003.

"Genetic algorithm," http://en.wikipedia.org/wiki/Genetic_algorithm, 8 pages, Mar. 2006.

"Explorations in Parallel Distributed Processing," McClelland et al., The Massachusetts Institute-of Technology, 42 pages, 1988.

Zhang et al., "Brushwood: Distributed Trees in Peer-to-Peer Systems", 6 pages (Mar. 2006).

"Distributed hash table," https://en.wikipedia.org/wiki/Distributed_hash_table, 5 pages (Mar. 2006).

"Artificial Neural Network," Wikipedia Encyclopedia, https://en.wikipedia.org/wiki/Artificial_neural_network, 16 pages, (Mar. 14, 2006).

Notice of Allowance cited in related U.S. Appl. No. 10/696,776 dated Jun. 13, 2007, 9 pgs.

Non-Final Office Action cited in related U.S. Appl. No. 11/072,525 dated Nov. 15, 2007, 11 pgs.

Reply to Non-Final Office Action cited in related U.S. Appl. No. 11/072,525 dated May 15, 2008, 9 pgs.

Non-Final Office Action cited in related U.S. Appl. No. 11/072,525 dated Jul. 21, 2008, 23 pgs.

"Leafset Protocol in Structured P2P Systems and its Application in Peer Selection," Zhang et al., Microsoft Technical Report, 2004, 12 pgs.

Reply to Non-Final Office Action cited in related U.S. Appl. No. 11/072,525 dated Jul. 21, 2008, 12 pgs.

Notice of Allowance cited in related U.S. Appl. No. 12/883,346 dated Jun. 21, 2012, 7 pgs.

Final Office Action cited in related U.S. Appl. No. 11/072,525 dated Apr. 15, 2009, 14 pgs.

Reply to Final Office Action cited in related U.S. Appl. No. 11/072,525 dated Sep. 15, 2009, 15 pgs.

Non-Final Office Action cited in related U.S. Appl. No. 11/072,525 dated Dec. 23, 2009, 17 pgs.

Reply to Non-Final Office Action cited in related U.S. Appl. No. 11/072,525 dated Mar. 17, 2010, 10 pgs.

Notice of Allowance cited in related U.S. Appl. No. 11/072,525 dated Jun. 24, 2010, 13 pgs.

Supplemental Notice of Allowance cited in related U.S. Appl. No. 11/072,525 dated Aug. 26, 2010, 11 pgs.

"Pastry: Scalable, decentralized object location and routing for large-scale peer-to-peer systems", Antony Rowstron and Peter Druschel, Distributed systems platforms; Middleware 2001, International Conference D Lecture Notes in Computer Science, vol. 2218, 22 pages, 2001.

"Looking Up Data in P2P Systems", Hari Balakrishnan, M. Frans Kaashoek, David Karger, Robert Morris and Ion Stoica, Communications of the ACM, vol. 46, No. 2, 5 pgs, Feb. 2003.

"Chord: A Scalable Peer-to-Peer Lookup Protocol for Internet Applications", Ion Stoica, Robert Morris, David Liben-Nowell, David R. Karger, M. Frans Kaashock, Frank Dabek and Hari Balakrishnan, IEEE/ D ACM Transactions on Networking, Feb. 2003, vol. 11, No. 1, pp. 1-14.

"INS/Twine: A Scalable Peer-to-Peer Architecture for Intentional Resource Discovery", Magdalena Balazinska, Hari Baladrishnan and David Karger, Pervasive Computing, First International Conference, Pervasive 2002. Proceedings, Lecture Notes in Computer Science, 2002, vol. 2414, 16 pgs.

"Scribe: A large-scale and decentralized application-level multicast infrastructure", Miguel Castro, Peter Deuschel, Anne-Marie Kermarrec and Antony Rowstron, IEEE Journal on Selected Areas in D communications, vol. 20, No. 8, Oct. 2002, pp. 100-110.

"Scribe: The design of a large-scale event notification infrastructure", Antony Rowstron, Anne=Marie Kermarrec, Miguel Castro and Peter Druschel, appears in the proceedings of 3rd International Workshop on Networked Group Communication (NGC2001 ), UCL, London, UK, Nov. 2001, 13 pgs.

(56) References Cited

OTHER PUBLICATIONS

"Chord: A Scalable Peer-to-Peer Lookup Service for Internet Applications", Ion Stoica, Robert Morris, David Karger, M. Frans Kaashoek, and Hari Balakrishnan, Computer Communication Review, Oct. 2001, vol. 31, No. 4, pp. 1-12.
"Wide-area cooperative storage with CFS", Frank Dabek, M. Frans Kaashoek, David Karger, Robert Morris and Ion Stoica, Operating Systems Review, Oct. 2001, vol. 35, No. 5, 14 pgs.
"Analysis of the Evolution of Peer-to-Peer Systems", David Liben-Nowell, Hari Balakrishnan and David Karger, Proceedings of the Twenty-First Annual ACM Symposium on Principles of Distributed Computing PODC, D 2002, 10 pgs.
"Finding Nearest Neighbors in Growth-restricted Metrics", David Karger and Matthias Ruhl, Conference Proceedings of the Annual ACM Symposium on Theory of Computing, May 2002, 10 pgs.
"Topology-aware routing in structured peer-to-peer overlay networks", Miguel Castro, Peter Druschel, Y. Charlie Hu and Antony Rowstron, Future directions in distributed computing, International Workshop Lecture Notes in Computer Science, 2003 No. 2584, 2003, 19 pgs.
"Secure routing for structured peer-to-peer overlay networks", Miguel Castro, Peter Deuschel, Ayal Vadi Ganesh, Antony Rowstron and Dans. Wallach, Operating Systems Design and Implementation, D Symposium, 5th Operating Systems Review, Dec. 2002, vol. 36, pp. 1-16.
"Observations on the Dynamic Evolution of Peer-to-Peer Networks", David Liben-Nowell, Hari Balakrishna and David Karger, International Workshop on Peer-to-Peer Systems, Lecture notes in computer science, Mar. 7, 2002, pp. 1-6.
Reply to Non-Final Office Action cited in related U.S. Appl. No. 11/072,525 dated Jan. 21, 2008, 12 pgs.
"Pastry: A Tasty Peer-to-Peer Recipe", Aaron Ricadela, Information Week, 2002, 4 pgs.
"Building Peer-to-Peer Systems With Chord, a Distributed Lookup Service", Frank Dabek et al., Proceedings Eighth Workshop on Hot Topics in Operating Systems, IEEE Comput. Soc., Los Alamitos, CA, 2001, 6 pgs.
"Neural Network," Wikipedia Encyclopedia, http://en.wikipedia.org/wiki/Neural_network (Mar. 16, 2006), 7 pgs.
"Peer-to-Peer Infrastructure: PeerGroupEnumMembers," Microsoft, http://msdn.microsoft.com/library/en-us/p2psdk/p2p/peergroupenum-members.asp?frame=true, 3 pages (Sep. 7, 2011).
"Peer-to-Peer Infrastructure: Grouping API Functions," Microsoft, http://msden.microsoft.com/library/en-us/pspsdk/psp/grouping_api_functions.asp?frame=true, 5 pgs. (Sep. 7, 2011).
"Peer-to-Peer Infrastructure: Identity Manager Functions," Microsoft, http://msdn.microsoft.com/library/en-us/p2psdk/p2p/identity_manager functions.asp?frame+true, 3 pgs. (Sep. 7, 2011).
"Peer-to-Peer Infrastructure: Creating a Group Chat Application," Microsoft, http://msdn.microsoft.com/library/en-us/p2psdk/psp/creating_a_group_chat_application.asp, 11 pgs. (Sep. 2, 2011).
"The Cable Guy—Nov. 2003: Windows Peer-to-Peer Systems", Microsoft TechNet, 7 pgs. (Mar. 2006).
"Latency," http://whatis.techtarget.com/definition/0,,sid9_0212456,00.html, 2 pgs. (Mar. 2006).
Ng, T.S.,et al., "A Network Positioning System for the Internet." USENIX Annual Technical Conference 2004, Boston, MA. http://www.cs.rice.edu/-eugeneng/papers/USENIX04.pdf pp. 1-14.
Nowell, David, et al., "Analysis of the Evolution of Peer-to-Peer Systems.", In Proceedings of the Twenty-First Annual ACM Symposium on Principles of Distributed Computing PODC 2002. https://pdos.csail.mit.edu/chord/papers/podc2002.pdf Date: 2002 pp. 1-10.
"Artificial Neural Network.", Wikipedia Encylcopedia. http://en.wikipedia.org/wiki/Artificial_neural_network Date: Mar. 14, 2006.
Zhang, et al., "Brushwood: Distributed Trees in Peer to Peer Systems." http://iptps05.cs.cornell.edu/PDFs/CameraReady_135.pdf Dated: Mar. 2006 pp. 1-6.
Dabek, et al., "Building Peer to Peer Systems with Chord, a Distributed Lookup Service." Proceedings of 8th Workshop on Hot Topics in Operating Systems, IEEE Computer Soc., Los Alamitos CA. http://pdos.csail.mit.edu/papers/chord:hotos01/hotos8.pdf Dated: 2001 pp. 1-6.
Stoica, Ion, et al.; "Chord: A Scalable Peer to Peer Lookup Service for Internet Applications", Computer Communication Review. http://pdos.csail.mit.edu/papers/chord:sigcomm01/chord_sigcomm.pdf Dated: Oct. 2011 pp. 1-14. vol. 31, No. 4.
Stoica, Ion, et al., "Chord: A Scalable Peer to Peer Lookup Protocol for Internet Applications." ACM Transactions on Networking. http://www.cs.berkeley.edu/~istoica/papers/2003/chord-ton.pdf Dated: Feb. 2003 pp. 1-12.
Ng, T.S., et al.; "Predicting Internet Network Distance With Coordinates-Based Approaches" INFOCOM 2002 Twenty-first Annual Joint Conference of the IEEE Computer and Communication Societies. Proceedings IEEE vol. 1 http://www.cs.rice.edu/~eugeneng/papers/INFOCOM02.pdf Dated: Jun. 2002 pp. 1-10.
"Distributed Hash Table", http://en.wikipedia.org/wiki/Distributed_hash_table Dated: Mar. 14, 2006 pp. 1-5.
McClelland, et al.; "Explorations in Parallel Distributed Processing" The Massachusettes Institute of Technology 1988. The MIT Press, Cambridge, Massachusetts http://www-psych.stanford.edu/~jim/papers/PDP/McClelland_EPDP/Intro_EPDP88.pdf Dated: 1987-1998 pp. 1-7.
Karger, David, et al.; "Finding Nearest Neighbors in Growth-restricted Metrics", Conference Proceedings of the Annual ACM Symposium on Theory of Computing. http://www.ic.unicamp.br/~celio/peer2peer/miscelanea/karger02finding.pdf Dated: May 2002 pp. 1-10.
"Genetic Algorithm", http://www.google.com/search?sourceid-navclient&ie-UTF-8&rls-GGLG,GGLG:2005-3 Dated: Mar. 2006.
"Genetic Algorithm" http://en.wikipedia.org/wiki/Genetic_algorithm Dated: Mar. 2006.
Ng, T.S., et al.; "Global Network Positioning: A New Approach to Network Distance Prediction" SIGCOMM'01 http://www.cs.rice.edu/~eugeneng/presentations/sigcomm01.pdf Dated: Aug. 2001 p. 1.
Balazinska, Magdelena, et al.; "INS/Twine: A Scalable Peer to Peer Architecture for International Resource Discovery" Pervasive Computing, First International Conference, Pervasive 2002. Proceedings Lecture Notes in Computer Science 2002, col. 2414 16 pages. http://nms.lcs.mit.edu/papers/twine-pervasive2002.pdf.
"Latency" http://searchcio-midmarket.techtarget.com/definition/latency Mar. 2006.
Balakrishnan, Hari, et at.; "Looking Up Data in P2P Systems." Communications of the ACM vol. 46, No. 2 http://www.cs.berkeley.edu/~istoica/papers/2003/cacm03.pdf Dated: Feb. 2003 pp. 1-5.
"Neural Network" Wikipedia Encyclopedia. http://en.wikipedia.org.wiki/neural_network Dated: Mar. 16, 2006.
Liben-Nowell, David, et al.; "Observations on the Dynamic Evolution of Peer to Peer Networks", International Workshop on Peer to Peer Systems, Lecture Notes in Computer Science http://citeseerx.ist.psu.edu/viewdoc/summary?doi=10.1.1.57.7069 Dated: Mar. 7, 2002 p. 106.
Ricadela, Aaron., "Pastry: A Tasty Peer to Peer Recipe" Published in: Information Week. Dated: May 13, 2002 pp. 1-4.
Rowstron, Anthony, et al.; "Pastry: Scalable, decentralized object location and routing for large-scale peer to peer systems" Distributed Systems Platforms, Middleware 2001. International Conference Lecture Notes in Computer Science 2001, vol. 2218 http://research.microsoft.com/en-us/um/people/antr/PAST/pastry.pdf Dated: 2001 pp. 1-22.
"Peer to Peer Infrastructure: Creating a Group Chat Application" Microsoft, http://msdn.microsoft.com/library/en-us/p2psdk/p2p/creating_a_group_chat_application.asp Dated: Sep. 7, 2011 pp. 11.
"Peer to Peer Infrastructure: Grouping API Functions", Microsoft, http://msdn.microsfot.com/library/en-us/p2psdk/p2p/grouping_api_functions.asp?frame=true Dated: Sep. 7, 2011 pp. 5.
"The Cable Guy—Windows Peer to Peer Networking" Microsoft Technet. http://technet.microsoft.com/en-us/library/bb878125.aspx Dated: Nov. 2003 pp. 6.
"Peer to Peer Infrastructure: Identity Manager Functions" Microsoft, http://msdn.microsoft.com/library/en-us/p2psdk/p2p/Identity_manager_functions.asp?frame=true Dated: Sep. 7, 2011 pp. 3.

(56) References Cited

OTHER PUBLICATIONS

"Peer to Peer Infrastructure: PeerGroupEnumMembers" Microsoft, http://msdn.microsoft.com/library/en-us/p2psdk/p2p/peergroupenum-members.asp?frame=true Dated: Sep. 7, 2011 pp. 3.

Costa, et al.; "PIC: Practical Internet Coordinates for Distance Estimation", ICDCS 2004. http://research.microsoft.com/en-us/um/people/antr/ms/PIC-ICDCS.pdf Dated: Mar. 2004 pp. 1-10.

Cox, R., et al.; "Practical Distributed Network Coordinates", Hotnets Workshop 2003 http://pdos.csail.mit.edu/papers/hotnets:vivaldi/ Dated: pp. 1-6.

Castro, Miguel, et al.; "Scribe: A large-scale and decentralized application-level multicast infrastructure" IEEE Journal on Selected Areas in Communications. vol. 20, No. 8. http://research.microsoft.com/en-us/um/people/antr/PAST/jsac.pdf Dated: Oct. 2002 pp. 100-110.

Rowstron, Anthony, et al.; "Scribe: The Design of a large-scale event notification infrastructure" In the Proceedings of 3rd International Workshop on Networked Group Communication (NGC2001) UCL, London, UK http://citeseerx.ist.psu.edu/viewdoc/summary?doi=10.1.1.28.5471 Dated: Nov. 2001 pp. 1-20.

Castro, Miguel, et al.; "Secure Routing for Structured Peer to Peer Overlay Networks" Operating Systems Design and Implementation, Symposium 5th Operating Systems Review. vol. 36. http://research.microsoft.com/en-us/um/people/antr/PAST/security.pdf Dated: Dec. 2002 pp. 1-16.

Castro, Miguel., et al.; "Topology Aware Routing in Structured Peer to Peer overlay Networks", Future Directions in distributed computing, International Workshop Lecture Notes in Computer Science. vol. 36. http://citeseerx.ist.psu.edu/viewdoc/summary?doi=10.1.1.14.7252 Dated: 2003 pp. 1-19.

Ng, T.S., Et al.; "Towards Global Network Positioning" Extended Abstract, ACM SIGCOMM Internet Measurement Workshop 2001. San Francisco, CA http://www.cs.rice.edu/~eugeneng/presentations/imw01.pdf Dated: Nov. 2001 pp. 1-40.

Dabek, F., et al.; "Vivaldi: A Decentralized Network Coordinate System" SIGCOMM 2004 https://www.cs.umd.edu/class/spring2007/cmsc711/papers/vivaldi.pdf Dated: Aug. 2004 pp. 1-12.

Dabek, Frank, et al.; "Wide-area Cooperative Storage with CFS" Operating Systems Review. vol. 35 No. 4 http://citeseer.ist.psu.edu/viewdoc/summary?doi=10.1.1.159.9358 Dated: Oct. 2001 pp. 1-14.

Notice of Allowance cited in related U.S. Appl. No. 10/696,776 dated Jun. 13, 2007 pp. 1-9.

Non Final Office Action cited in related U.S. Appl. No. 11/072,525 dated Nov. 15, 2007 pp. 1-11.

Response to Non Final Office Action cited in related U.S. Appl. No. 11/072,525 dated May 15, 2008 pp. 1-9.

Non Final Office Action cited in related U.S. Appl. No. 11/072,525 dated Jul. 21, 2008 pp. 1-23.

Reply to Non Final Office Action cited in related U.S. Appl. No. 11/072,525 dated Jan. 21, 2009 pp. 1-12.

Final Office Action cited in related U.S. Appl. No. 11/072,525 dated Apr. 15, 2009 pp. 1-14.

Reply to Final Office Action cited in related U.S. Appl. No. 11/072,525 dated Sep. 15, 2009 pp. 1-15.

Non Final Office Action cited in related U.S. Appl. No. 11/072,525, dated Dec. 23, 2009 pp. 1-17.

Reply to Non Final Office Action cited in related U.S. Appl. No. 11/072,525 dated Mar. 17, 2010 pp. 1-10.

Notice of Allowance cited in related U.S. Appl. No. 11/072,525 dated Jun. 24, 2010 pp. 1-13.

Supplemental Notice of Allowance cited in related U.S. Appl. No. 11/072,525 dated Aug. 26, 2010 pp. 1-11.

Response to Amendment cited in related U.S. Appl. No. 12/883,346 dated Oct. 12, 2012 pp. 1-4.

Amendment cited in cited in related U.S. Appl. No. 12/883,346 dated Sep. 21, 2012 pp. 1-13.

Notice of Allowance cited in related U.S. Appl. No. 12/883,346 dated Jun. 21, 2012 pp. 1-20.

Amendment cited in related U.S. Appl. No. 12/883,346 dated Apr. 26, 2012 pp. 1-12.

Notice of Allowance cited in related U.S. Appl. No. 12/883,346 dated Jan. 26, 2012 pp. 1-9.

Response to Office Action cited in related U.S. Appl. No. 12/883,346 dated Aug. 29, 2011 pp. 1-15.

Office Action cited in related U.S. Appl. No. 12/883,346 dated Jun. 28, 2011 pp. 1-19.

* cited by examiner

SYSTEM AND METHOD FOR IMPLEMENTING PNRP LOCALITY

RELATED APPLICATION

This application is a continuation of U.S. patent application Ser. No. 12/883,346, filed on Sep. 16, 2010, entitled "SYSTEM AND METHOD FOR IMPLEMENTING PNRP LOCALITY" and U.S. patent application Ser. No. 11/072,525, filed on Mar. 7, 2005, entitled "SYSTEM AND METHOD FOR IMPLEMENTING PNRP LOCALITY," at least some of at least one of which may be incorporated herein.

BACKGROUND

The PNRP cache does not adequately take network proximity (locality) of nodes into account when adding one or more (e.g., most) entries to the cache, and when routing messages in the global cloud. A message routed through H hops will, on average, travel half of the topological width of the cloud for each hop. If the network latency for such a hop is k seconds, this results in the resolve requiring 2*H*k seconds to traverse the network, as it must travel roughly the same path as a RESOLVE and a RESPONSE. Retransmits and local processing time are also factors in the overall RESOLVE time. In addition to increasing latency, the existing cache strategy results in greater internet-wide traffic than required. Messages on average are traversing half the internet on each hop. Accordingly, there is a need in the art to dramatically reduce in-transit time for PNRP resolution requests by applying locality metrics to all cache selection operations. The same scheme will encourage PNRP traffic to stay as local as possible, significantly reducing load on the internet as a whole.

SUMMARY

In view of the foregoing, a method and computer product are provided for a host node in a computer network to determine its coordinates in a d-dimensional network space, comprising discovering an address of a peer node in the network, measuring network latency between the host node and the peer node, determining whether network latency has been measured for at least d+1 peer nodes, where, if network latency has not been measured for at least d+1 peer nodes, estimating the network coordinates of the host node, and where, if network latency has been measured for at least d+1 peer nodes, calculating the network coordinates of the host node using d+1 measured latencies. In one embodiment, the host node communicates with the peer node using peer-to-peer name resolution protocol (PNRP), and the address is a PNRP certified peer address. The certified peer address may include network coordinates for the peer node.

In another embodiment, the d-dimensional network space is a seven dimensional network space. Estimating the network coordinates may be performed using the Downhill Simplex method. Yet another embodiment may comprise discovering a new peer node, measuring network latency between the host node and the new peer node, and recalculating the network coordinates of the host node base on the measured network latency of the new node. Still another embodiment may comprise determining that the network coordinates of the host node and incorrect, discarding the network coordinates of the host node, selecting a subset of known peer nodes, measuring network latency between the host node and the subset of known peer nodes and recalculating the network coordinates of the host node using measured network latency.

Additional features and advantages of the disclosed subject matter are made apparent from the following detailed description of illustrative embodiments that proceeds with reference to the accompanying figures.

DESCRIPTION OF THE DRAWINGS

The accompanying drawings illustrate several aspects of the disclosed subject matter, and together with the description serve to explain the principles of the disclosed subject matter. In the drawings.

DETAILED DESCRIPTION

Figure 1A:
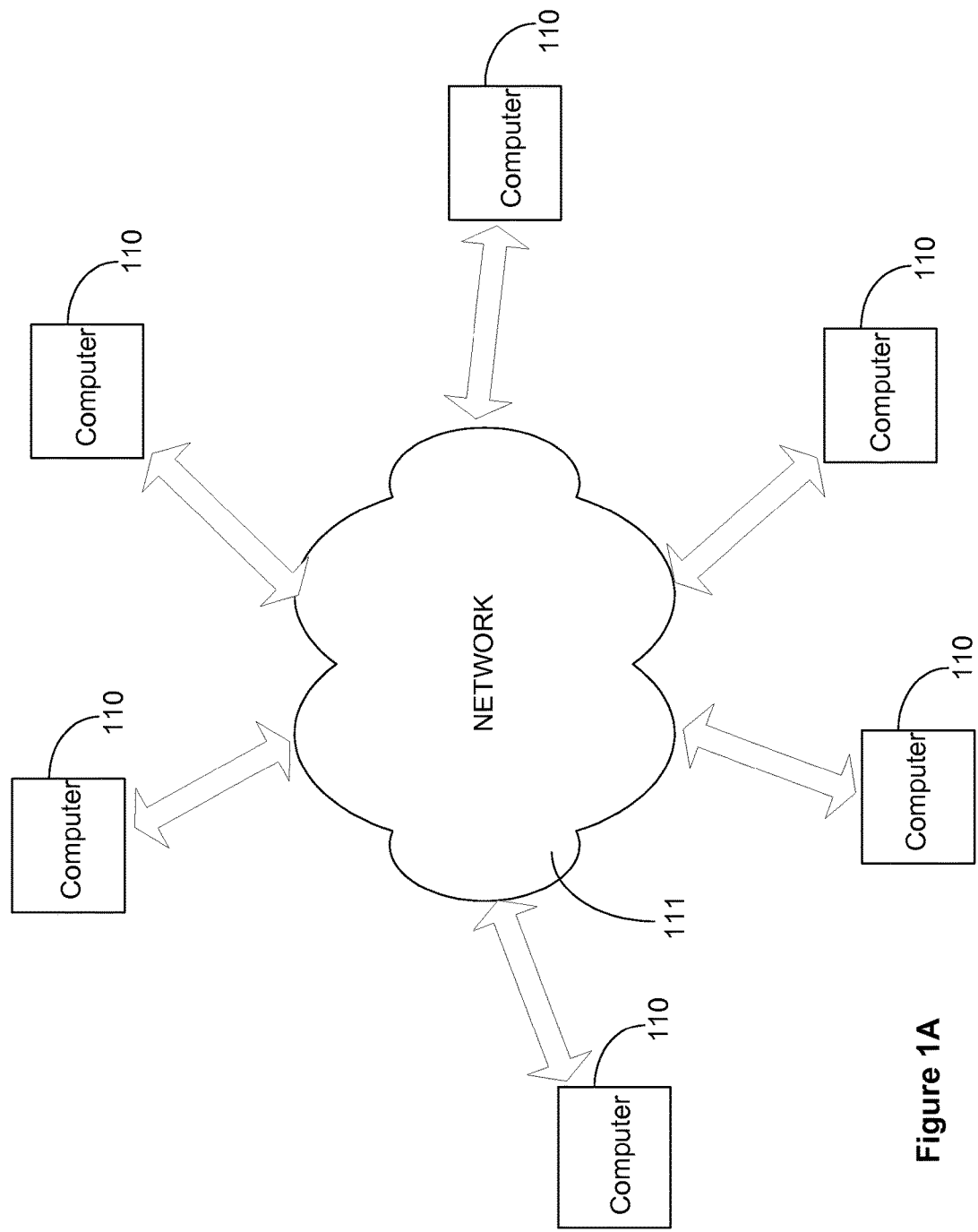
FIG. 1A is a schematic generally illustrating an exemplary network environment.

Turning to the drawings, wherein like reference numerals refer to like elements, the disclosed subject matter is illustrated as being implemented in a suitable computing environment. The following description is based on embodiments of the disclosed subject matter and should not be taken as limiting the disclosed subject matter with regard to alternative embodiments that are not explicitly described herein.

In the description that follows, the disclosed subject matter is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the disclosed subject matter is being described in the foregoing context, it is not meant to be limiting as those of skill in the art will appreciate that the various acts and operations described hereinafter may also be implemented in hardware.

An example of a networked environment in which the disclosed subject matter may be used will now be described with reference to FIG. 1A. The example network includes several computers 110 communicating with one another over a network 111, represented by a cloud. Network 111 may include many well-known components, such as routers, gateways, hubs, etc. and allows the computers 110 to communicate via wired and/or wireless media. When interacting with one another over the network 111, one or more of the computers may act as clients, network servers, or peers with respect to other computers. Accordingly, the various embodiments of the disclosed subject matter may be practiced on clients, network servers, peers, or combinations thereof, even though specific examples contained herein do not refer to all of these types of computers.

Figure 1B:
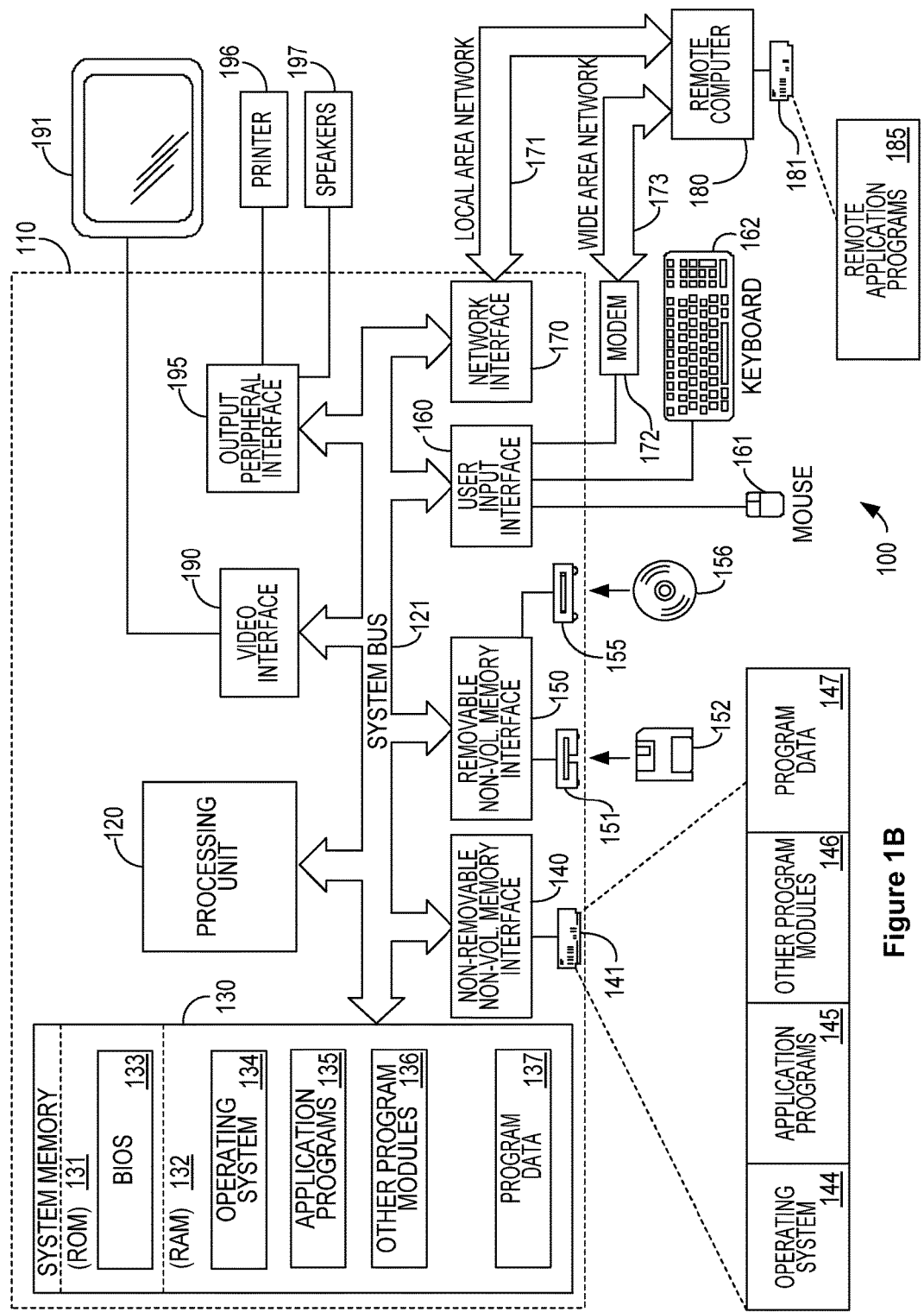
FIG. 1B is a block diagram generally illustrating an exemplary computer system.

FIG. 1B illustrates an example of a suitable computing system environment 100 on which the disclosed subject matter may be implemented. The computing system environment 100 is only one example of a suitable computing environment and is not intended to suggest any limitation as to the scope of use or functionality of the disclosed subject matter. Neither should the computing environment 100 be interpreted as having any dependency or requirement relating to any one or combination of components illustrated in the exemplary computing environment 100.

The disclosed subject matter is operational with numerous other general-purpose or special-purpose computing system environments or configurations. Examples of well known computing systems, environments, and configurations that may be suitable for use with the disclosed subject matter include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

The disclosed subject matter may be described in the general context of computer-executable instructions, such as program modules, being executed by a computer. Generally, program modules include routines, programs, objects, components, data structures, etc., that perform particular tasks or implement particular abstract data types. The disclosed subject matter may also be practiced in distributed computing environments where tasks are performed by remote processing devices that are linked through a communications network. In a distributed computing environment, program modules may be located in both local and remote computer-storage media including memory-storage devices.

With reference to FIG. 1B, an exemplary system for implementing the disclosed subject matter includes a general-purpose computing device in the form of a computer 110, which may act as a client, network server, quarantine server, or peer within the context of the disclosed subject matter. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture bus, Micro Channel Architecture bus, Enhanced ISA bus, Video Electronics Standards Associate local bus, and Peripheral Component Interconnect bus, also known as Mezzanine bus.

The computer 110 typically includes a variety of computer-readable media. Computer-readable media can be any available media that can be accessed by the computer 110 and include both volatile and nonvolatile media, removable and non-removable media. By way of example, and not limitation, computer-readable media may include computer storage media and communication media. Computer storage media include both volatile and nonvolatile, removable and non-removable media implemented in any method or technology for the storage of information such as computer-readable instructions, data structures, program modules, or other data. Computer storage media include, but are not limited to, RAM, ROM, EEPROM, flash memory or other memory technology, CD-ROM, digital versatile disks or other optical disk storage, magnetic cassettes, magnetic tape, magnetic disk storage or other magnetic storage devices, or any other medium which can be used to store the desired information and which can be accessed by the computer 110. Communication media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communication media include wired media such as a wired network or direct-wired connection and wireless media such as acoustic, RF, infrared, and other wireless media. Combinations of the any of the above should also be included within the scope of computer-readable media.

The system memory 130 includes computer storage media in the form of volatile and nonvolatile memory such as read only memory (ROM) 131 and random access memory (RAM) 132. A basic input/output system 133 (BIOS), containing the basic routines that help to transfer information between elements within the computer 110, such as during start-up, is typically stored in ROM 131. RAM 132 typically contains data and program modules that are immediately accessible to or presently being operated on by the processing unit 120. By way of example, and not limitation, FIG. 1B illustrates an operating system 134, application programs 135, other program modules 136, and program data 137.

The computer 110 may also include other removable/non-removable, volatile/nonvolatile computer storage media. By way of example only, FIG. 1B illustrates a hard disk drive 141 that reads from or writes to non-removable, nonvolatile, magnetic media, a magnetic disk drive 151 that reads from or writes to a removable, nonvolatile, magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary computing environment 100 include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as the interface 140, and the magnetic disk drive 151 and the optical disk drive 155 are typically connected to the system bus 121 by a removable memory interface, such as the interface 150.

The drives and their associated computer storage media discussed above and illustrated in FIG. 1B provide storage of computer-readable instructions, data structures, program modules, and other data for the computer 110. In FIG. 1B, for example, the hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers to illustrate that, at a minimum, they are different copies.

A user may enter commands and information into the computer 110 through input devices such as a keyboard 162 and a pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus. A monitor 191 or other type of display device is also connected to the system bus 121 via an interface, such as a video interface 190. In addition to the monitor 191, the computer 110 may also include other peripheral output devices such as speakers 197 and a printer 196 which may be connected through an output peripheral interface 195.

The computer 110 operates in a networked environment using logical connections to one or more remote computers, such as a remote computer 180. The remote computer 180 may be a personal computer, a server, a router, a network PC, a peer device, or other common network node and typically includes many or all of the elements described above relative to the personal computer 110 although only a memory storage device 181 has been illustrated in FIG. 1B. The logical connections depicted in FIG. 1B include a local area network (LAN) 171 and a wide area network (WAN) 173 but may also include other networks. Such networking environments are commonplace in offices, enterprise-wide computer networks, intranets, and the Internet. Furthermore, LAN 171 includes both wired and wireless connections.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the personal computer 110, or portions thereof, may be stored in the remote memory storage device 181. By way of example, and not limitation, FIG. 1B illustrates the remote application programs 185 as residing on the memory device 181. It will be appreciated that the network connections shown are exemplary, and other means of establishing a communications link between the computers may be used.

Figure 2:
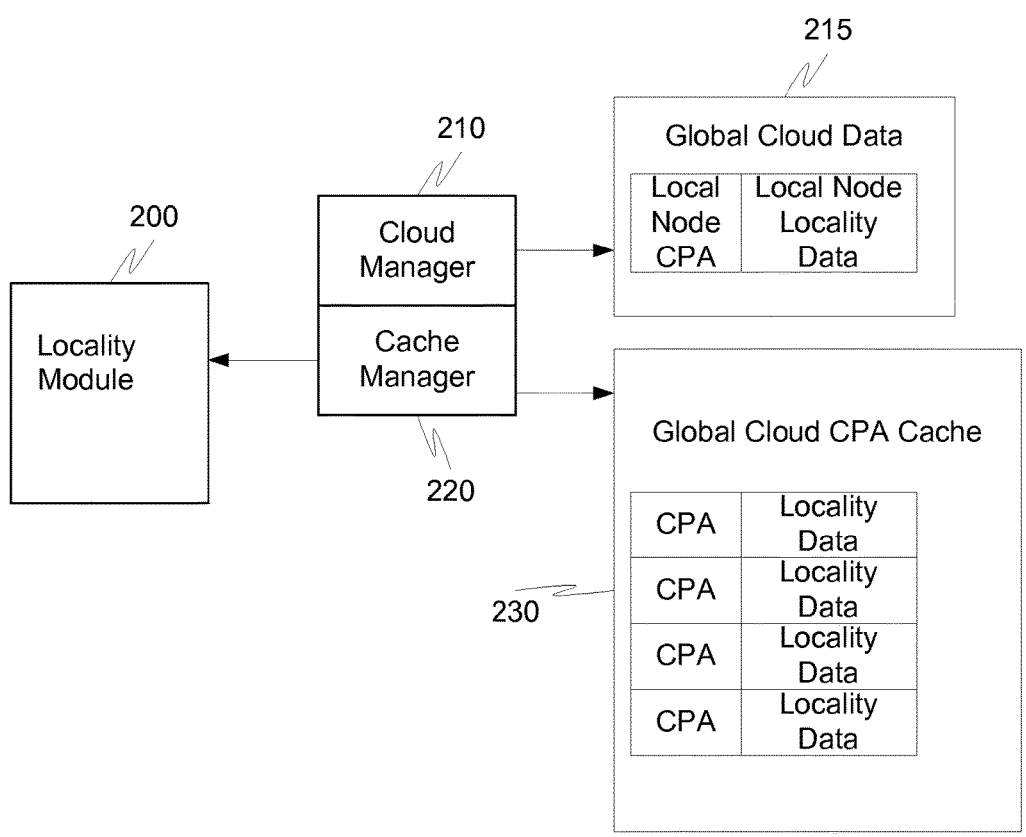
FIG. 2 is a diagram illustrating at least some components described herein.

FIG. 2 illustrates a high-level architecture diagram of PNRP with the locality framework of the disclosed subject matter. Locality module 200 provides a locality mechanism to the existing PNRP framework. Cloud manager 210 tracks the locality configuration for the local node, whether or not locality is enabled, and the name of the locality module if it is enabled. Cloud manager 210 stores the local node CPA and local node locality data in global cloud data store 215. Cache manager 220 tracks local node locality data, along with a state which indicates whether or not a valid locality estimation has been obtained from the locality framework. Each node has a single locality data instance per cloud. The cache manager 220 stores the locality data for each entry in the cache 230. In one embodiment, locality data is stored as part of the CPA. In another embodiment, locality data is stored separately in the cache 230.

In one embodiment, the locality module 200 is a DLL that provides a utility routine used by the cloud manager 210 to generate the node's locality data, which is propagated with its CPA. The locality module 200 also provides a utility routine used by the cache manager 220 to measure relative locality between the node and any other node for which it has locality data. The locality module 200 further provides a utility routine for validating locality data received from other nodes, and for providing PNRP with information on the locality module.

Locality is inversely proportional to latency. In other words, the lower the latency between two nodes, the more local they are considered. In accordance with one embodiment, each locality-aware node assigns itself coordinates in a 7-dimensional space, based upon coordinates of other locality-aware nodes and measured latencies between itself and those nodes. In various embodiments, the number of dimensions for locality calculation may be between 7 and 12. Dimensionality of the coordinate space is configurable, but uniform throughout the cloud. To uniquely fix coordinates in a space of dimensionality d, a node requires d+1 data points.

Locality-aware nodes include their coordinates in 'locality data' whenever transmitting their CPA. They also propagate coordinates whenever transmitting the CPA of other locality-aware nodes. Non-locality-aware nodes are able to propagate locality coordinates they receive, since the coordinates will be either part of the CPA, or an additional message field which by default PNRP propagates without modification. Whenever evaluating a CPA for locality, the distance between the local node and the node publishing the CPA is estimated using simple Cartesian distance in the coordinate space. If each node's location estimate is relatively accurate, locality-based caches are constructed without requiring a probe to cached entries.

When bootstrapping, a new node adds a field to the SOLICIT specifying that it prefers locality-aware CPA's from the seed node's cache. The resulting ADVERTISE, when created by a node which understands locality, will specify which of the advertised CPA's include locality information. A locality-aware node attempts to obtain CPAs for at least d+1 locality-aware nodes to accurately estimate its position in network space, where d is the dimensionality of the coordinate space. However, the node may make preliminary estimates when it has less data, to facilitate cloud bootstrapping. This estimate is refined over time, so it is acceptable for the first estimate to be rough.

Suppose a node C is bootstrapping. If it is the first node in the cloud, it sets its coordinates to the origin—[32767, 32767, . . . , 32767] in a space using unsigned shorts for coordinates. Otherwise it performs coordinate estimation as follows. As each new CPA (from the bootstrap process) is received, the new node probes the CPA publisher to estimate latency. In one embodiment, the probe is an INQUIRE/AUTHORITY exchange. In another embodiment, the probe is a transport 'ping.' The probe results are stored along with the CPA. In order to minimize the impact of network irregularities on position estimation, at least three probes are performed.

For the first d+1 pieces of locality data the node receives, it refines its locality coordinates based on the new information. The node makes an initial estimate of its network location. In one embodiment, coordinate estimation is performed using the Downhill Simplex algorithm, a well-known simplex method for function minimalization. In other embodiments, an equivalent minimalization method may be used. If the calculation is under-constrained, Downhill Simplex will still result in a potential set of solutions corresponding to a hyperplane satisfying the known locality constraints. The locality module then chooses an arbitrary solution on this hyperplane. This will not adversely affect locality calculations, as it corresponds to selecting a rotation of potential solution coordinate spaces satisfying the known constraints. In the degenerate case (no other locality-aware nodes), a node places itself at the origin of the coordinate space.

Figure 3:
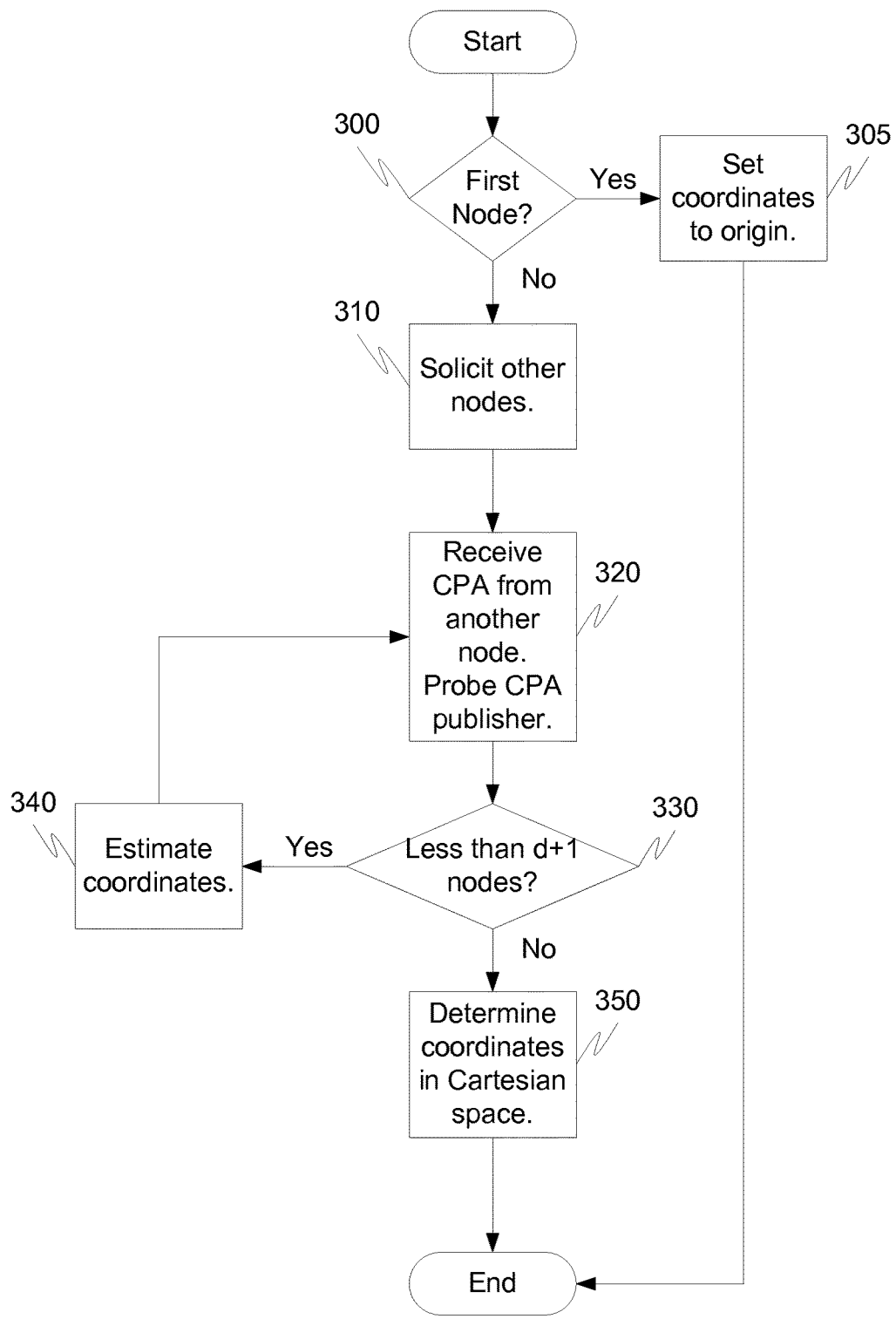
FIG. 3 is a diagram illustrating a coordinate determination method.

FIG. 3 is a flow diagram illustrating a method of coordinate estimation. At step 300, a node determines whether or not it is the first locality-aware node in the cloud. If so, the node sets its coordinates at the origin of the d-dimensional space at step 305. Otherwise, the node SOLICITs other locality aware nodes at step 310. At step 320, for each CPA received the node probes the publisher of the CPA to determine latency. The results are stored with the corresponding CPA. If the node has probe results for less than d+1 other nodes at step 330, the node estimates its coordinates using the presently acquired results with a minimalization function and continues to probe other nodes at step 340. If the node has probe results from at least d+1 nodes, the node determines its coordinates in the d-dimensional Cartesian space at step 350.

Over time a node learns about new locality-aware nodes, and culls or replaces some locality-aware entries in its cache. The node may perform an INQUIRE to estimate latency between itself and the other node. The measured latency is stored along with earlier probe results, allowing the node to periodically refine its estimated position in the coordinate space. Additional data points help to produce more accurate results over time.

After a major change in cloud topology, it may be necessary to reset the coordinate estimates. Coordinate estimate reset can be triggered by the following conditions:

Local address change. If the local node has moved to a new network, its topological relationship with other nodes may have changed.

Estimate/measurement disparity. As part of normal operation, the local node will learn of the actual RTT to nodes for which it can also estimate RTT. If a sufficient number of nodes have locality data which doesn't resemble the measured latency, then either the node is under attack, or the network has changed shape from the node's perspective.

Mobile IPv6 migration. If a mobile node moves to a new location, even though its address doesn't change, its coordinates should be updated. Note that this is not a concern for the foreseeable future, as mobile IPv6 is not a longhorn feature.

Cloud merge. If a PNRP cloud merge is triggered and the local node is helping repair the merge, it should recalculate its coordinates. If the separate clouds were originally part of the same cloud, coordinates should be valid. If the two clouds were never unified, they will have conflicting coordinate spaces, and one or both clouds will need to recalculate their coordinates.

Coordinate estimate reset is performed by re-measuring latency to a select subset of the cache. Latency is measured to the leafset as a "random location" subset, and to the closest (in terms of locality) nodes in the cache, usually kept in the top cache level. If additional measurements are required, they can be made to nodes contained in the second highest and second lowest cache levels, etc. The new coordinate calculations are made against at least d+1 nodes, and preferably more (such as 2d nodes) to improve accuracy. After calculating the new coordinates, sum of squares error between estimated and measured distances for the new calculations and the old calculations are compared for d+1 nodes. If the new error is similar to or less than the old error, coordinates for the space are still valid, and the new estimate should be used.

If the error is significantly greater, some of the coordinates used for coordinate estimation are most likely wrong, and therefore there has been a network or coordinate space reshaping. The new estimate is retained, and a timer is initiated to reset coordinates after a random interval, for example 180 to 300 seconds. During that interval, the local node receives updated CPAs from other nodes, which gives it a new pool of nodes to calculate coordinates against.

Locality relies upon having a cache containing nearby nodes. Establishing and maintaining such a cache requires changes to cache entry replacement logic. A cache replacement method for locality aware nodes follows. At step 1, a new CPA for a node X is received by a node C. At step 2, C compares X to active cache levels to determine which local cache level L X belongs in. Each cache level can hold up to 10 entries. It is divided into a 'left' and 'right' side (or hemisphere) of five entries each. Entries which are less than X modulo 2256 go in the left hemisphere, and entries which are greater than X modulo 2256 go in the right hemisphere. At step 3, C determines which hemisphere H node X belongs in. At step 4, if level L hemisphere H has at least one open slot, or is a lowest cache level, then no replacement is necessary, and the entry is added to the cache. Otherwise, follow the replacement algorithm to select an entry in L, H to replace.

At step 5, node C calculates the "ideal slot" for X in the cache, and finds the cached entry in L, H which is closest to occupying that slot. At step 6, node C checks to see whether H is trusted. If so, the new entry is discarded unless X is also trusted. At step 7, node C checks to see whether H or X have IPv6 address aggregators in common with the local node. If so, and those aggregators are not TEREDO addresses, then the common prefix is a stronger metric than latency, and the appropriate cache entry will be retained/added. If both H and X are equally preferred in terms of aggregator, node C proceeds to step 8. At step 8, node C acquires the measured round trip distance D for both H and X. If this distance is missing for either, but locality information is available, node C calculates the locality distance D of node X from node C. If insufficient information is available for this calculation, node C treats node X as further than all other cache entries with locality information.

At step 9, node C compares the locality distance D to the locality distance of the selected cache entry. Node C then caches the entry with the smaller distance at step 10. If probabilistic replacement is desired, probability can be generated depending upon relative locality distance of node X and the selected cache entry from node C. This approach significantly simplifies cache replacement.

A method of changing PNRP to include a locality-aware framework is presented. Those of ordinary skill in the art will understand that the locality mechanism described in this specification may be implemented without PNRP, or with a different peer name resolution protocol.

The foregoing description of various embodiments of the disclosed subject matter has been presented for purposes of illustration and description. It is not intended to be exhaustive or to limit the disclosed subject matter to the precise embodiments disclosed. Numerous modifications or variations are possible in light of the above teachings. The embodiments discussed were chosen and described to provide the best illustration of the principles of the disclosed subject matter and its practical application to thereby enable one of ordinary skill in the art to utilize the disclosed subject matter in various embodiments and with various modifications as are suited to the particular use contemplated. All such modifications and variations are within the scope of the disclosed subject matter as determined by the appended claims.

What is claimed is:

1. A method, comprising:
   determining, by one or more processors of a computing system, one or more network latencies between a host node and one or more peer nodes, wherein determining the one or more network latencies comprises probing at least one publisher of an address of a peer node and storing probe results in a cache; and
   determining, by the one or more processors, a set of network coordinates of the host node in a coordinate space at least partly based on the one or more network latencies, the determining including:
      determining whether the cache comprises probe results indicating one or more network latencies for at least d+1 peer nodes of the one or more peer nodes, d being an integer representing a dimensionality of the coordinate space; and
      based at least partly on a first determination that the cache does not comprise the probe results indicating the one or more network latencies for the at least d+1 peer nodes, estimating the set of network coordinates of the host node; or
      based at least partly on a second determination that the cache does comprise the probe results indicating the one or more network latencies for the at least d+1 peer nodes, calculating the set of network coordinates of the host node using d+1 network latencies.

2. The method of claim 1, the method further comprising: receiving a trigger for coordinate reset.

3. The method of claim 1, the method further comprising determining a subset of known locality-aware peer nodes based upon the host node.

4. The method of claim 1, wherein the host node is associated with a peer-to-peer network.

5. The method of claim 1, the method further comprising: resetting the set of network coordinates of the host node upon expiration of a timer.

6. The method of claim 1, wherein the host node is configured to use Peer Name Resolution Protocol (PNRP).

7. A system, comprising:
   one or more processing units; and
   memory comprising instructions that, responsive to being executed by at least one of the one or more processing units, perform operations comprising:
      determining one or more network latencies between a host node and one or more peer nodes, wherein determining the one or more network latencies comprises probing at least one publisher of an address of a peer node and storing probe results in a cache; and
      determining a set of network coordinates of the host node in a coordinate space at least partly based on the one or more network latencies, the determining including:
         determining whether the cache comprises probe results indicating one or more network latencies for at least d+1 peer nodes of the one or more peer nodes, d being an integer representing a dimensionality of the coordinate space; and
         in response to determining that the cache does not comprise the probe results indicating the one or more network latencies for the at least d+1 peer nodes, estimating the set of network coordinates of the host node.

8. The system of claim 7, wherein the operations further comprise receiving a trigger for coordinate reset.

9. The system of claim 7, wherein the operations further comprise determining a subset of known locality-aware peer nodes based upon the host node.

10. The system of claim 7, wherein the host node is associated with a peer-to-peer network.

11. The system of claim 7, wherein the operations further comprise: resetting the set of network coordinates of the host node.

12. The system of claim 7, wherein the host node is configured to use Peer Name Resolution Protocol (PNRP).

13. A computer-readable storage device comprising instructions that are executable by one or more processors of a computing system to perform operations comprising:
   determining one or more network latencies between a host node and one or more peer nodes, wherein determining the one or more network latencies comprises probing at least one publisher of an address of a peer node and storing probe results in a cache; and
   determining a set of network coordinates of the host node in a coordinate space at least partly based on the one or more network latencies, the determining including:
      determining whether the cache comprises probe results indicating one or more network latencies for at least d+1 peer nodes of the one or more peer nodes, d being an integer representing a dimensionality of the coordinate space; and
      in response to determining that the cache does not comprise the probe results indicating the one or more network latencies for the at least d+1 peer nodes, estimating the set of network coordinates of the host node.

14. The computer-readable storage device of claim 13, the operations further comprising: receiving a trigger for coordinate reset.

15. The computer-readable storage device of claim 13, the operations further comprising determining a subset of known locality-aware peer nodes based upon the host node.

16. The computer-readable storage device of claim 13, wherein the host node is associated with a peer-to-peer network.

17. The computer-readable storage device of claim 13, the operations further comprising resetting one or more network coordinates in the set of network coordinates of the host node.

18. The computer-readable storage device of claim 13, wherein the host node is configured to use Peer Name Resolution Protocol (PNRP).

19. The method of claim 17, further comprising discovering a Peer Name Resolution Protocol (PNRP) certified peer address of a peer node.

20. The system of claim 7, wherein the operations further comprise discovering a Peer Name Resolution Protocol (PNRP) certified peer address of a peer node.

* * * * *